(12) United States Patent
Kuo (10) Patent No.: US 7,187,836 B2
(45) Date of Patent: Mar. 6, 2007

(54) LIGHT-GUIDING MODULE

(76) Inventor: Heng-Sheng Kuo, P.O. Box 26-757, Taipei 106 (TW)

( * ) Notice: Subject to any disclaimer, the term of this patent is extended or adjusted under 35 U.S.C. 154(b) by 0 days.

(21) Appl. No.: 11/142,205

(22) Filed: Jun. 2, 2005

(65) Prior Publication Data

US 2006/0275003 A1    Dec. 7, 2006

(51) Int. Cl.
*G02B 6/10* (2006.01)
(52) U.S. Cl. ........................ 385/129; 385/901
(58) Field of Classification Search ................ 385/129, 385/901, 134–137, 146
See application file for complete search history.

(56) References Cited

U.S. PATENT DOCUMENTS 5,123,077 A * 6/1992 Endo et al. ................. 385/129
5,808,708 A * 9/1998 Oyama et al. ................ 349/65
6,902,285 B2 * 6/2005 Eiraku et al. ................. 362/26
6,993,244 B2 * 1/2006 Kuo ........................... 385/120

* cited by examiner

*Primary Examiner*—Sarah Song
(74) *Attorney, Agent, or Firm*—Rosenberg, Klein & Lee (57) ABSTRACT

A light-guiding module, which, with a diffusion sheet and a prism sheet (or a diffusion sheet and a brightness enhancement film), forms a backlighting module that includes a reflection cover, a light-guiding plate and at least one lighting mechanism. The reflection cover has a receiving part and reflects light. The light-guiding plate is transparent, and the light-guiding plate receives the receiving part of the reflection cover. The lighting mechanism receives the receiving part of the reflection cover, and the lighting mechanism is disposed between the side of the light-guiding plate and the inner-side of the receiving part. The frame is cover by the reflection cover.

16 Claims, 11 Drawing Sheets

LIGHT-GUIDING MODULE

BACKGROUND OF THE INVENTION

1. Field of the Invention

The present invention relates to a light-guiding module. In particularly the present invention relates to combine a reflection unit with a light-guiding plate.

2. Description of Related Art

A backlight module uses as a backlight source, and is applied broadly to various information, communication and consumer products, such as LCDs, film scanners, filmstrips or overhead projectors. The LCD field is the main application of the backlight module and has flourished recently, so that the components of the backlight module are becoming more and more important. How to reduce the cost of materials, shorten the time needed for assembly, improve manufacturing efficiency, increase the lighting uniformity, and increase the illumination are the main issues that need to be solved in this field.

The backlight module comprises a light source, a light-guiding plate, a reflection sheet, a diffusion sheet, a prism sheet (or a brightness enhancement film) and so on. The principle of the backlight module can be described simply as a spontaneous light source, for example a CCFL or LEDs, is guided by the light-guiding plate, then to generate a large, evenly and brightly illuminated surface, the reflection sheet reflects the light scattered therefrom to the illuminated surface. The advantages of the backlight module comprise: its weight is light, the illumination is high, the viewing angle is excellent, the efficiency of light-utilizing is high, and its structure is simple. In general, during the backlight module assembly process, the spontaneous light source faces to the light-guiding plate. The other surfaces of the light-guiding plate are pasted with reflection sheets except for the illumination surface, which are provided to reflect the light at the bottom and the edge of the light-guiding plate in order to improve the lighting efficiency. A light-guiding module is composed of the light source, a light-guiding plate and reflection sheets.

Figure 1:
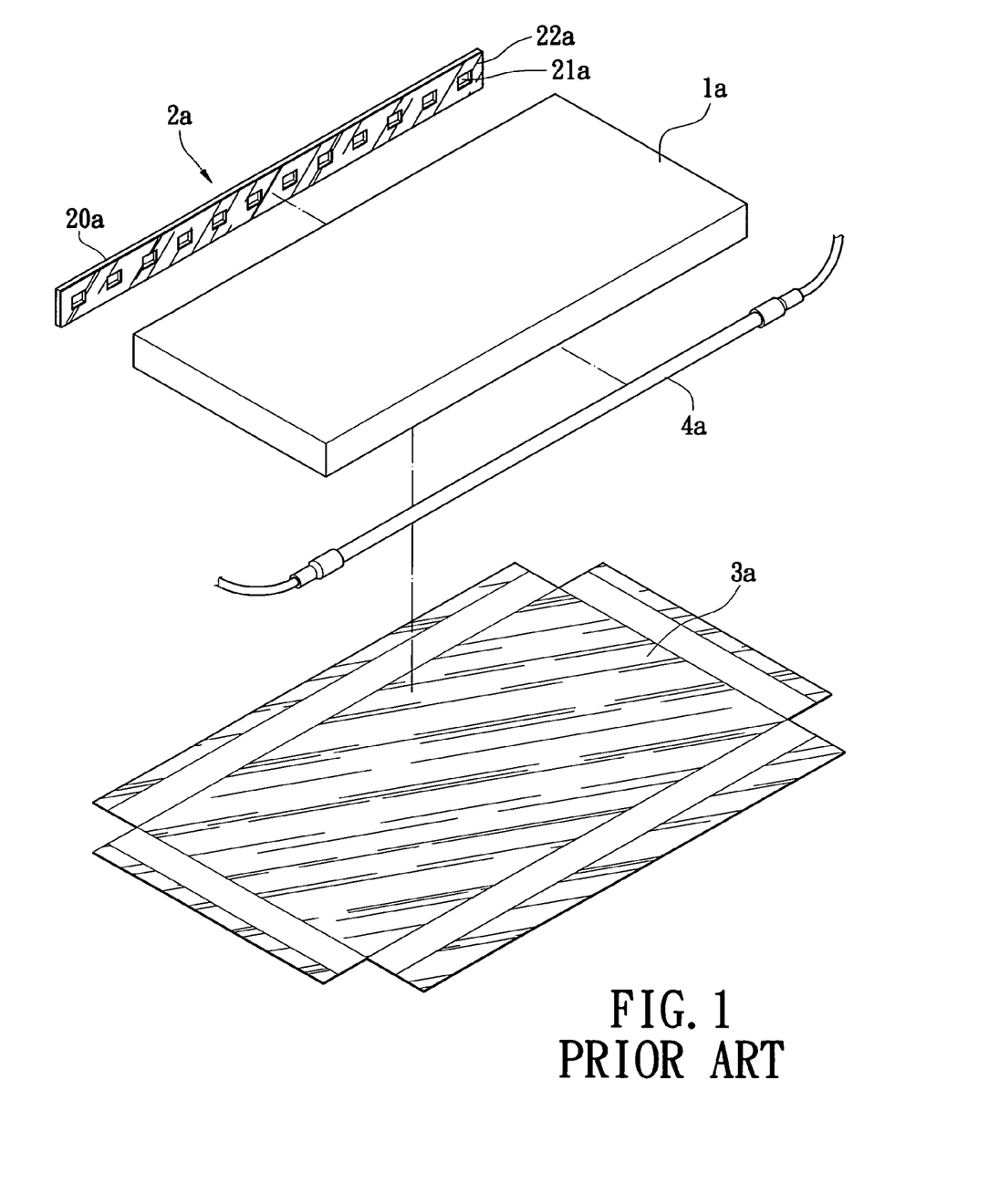
FIG. 1 is a decomposition view of a conventional light-guiding module according to a prior art.
Figure 2:
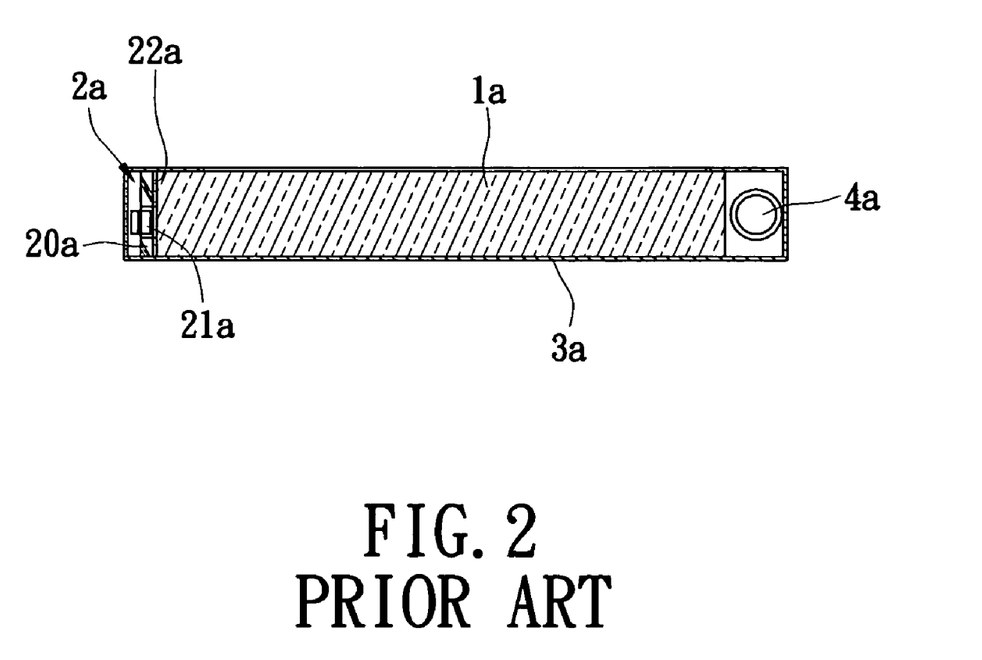
FIG. 2 is a cutaway view of a conventional light-guiding module according to the prior art.

Reference is made to FIGS. 1 and 2, a light-guiding module of the prior art comprises a light-guiding plate, a LED module 2a disposed at one side of the light-guiding plate 1a, a CCFL 4a arranged opposite to the LED module 2a, and a reflection sheet 3a pasted on a bottom surface of the light-guiding plate 1a. The reflection sheet 3a extends from the bottom surface of the light-guiding plate 1a to the side surfaces of the light-guiding plate 1a and wraps the light-guiding plate 1a. The backlight module is composed by the light-guiding module of the prior art, diffusion sheet, etc. The LED module 2a comprises a printed circuit board (PCB) 20a and a plurality of LEDs 21a disposed on the PCB 20a. In order to prevent PCB 20a from absorbing the light emitting from the LEDs 21a (it depends on the material of the PCB 20a and the reflection rate), a reflection sheet 22a is pasted on the PCB 20a and faces to the light-guiding plate 1a before the LED module 2a is assembled to the light-guiding plate 1a. Therefore, light absorbed by the PCB 20a can be diminished.

The conventional method of manufacturing a light-guiding module has three major drawbacks that the present invention seeks to overcome. Firstly, the step of pasting the reflection sheet 22a is performed before the LED lighting module 2a is assembled together with the light-guiding plate 1a. Moreover, the reflection sheet 22a must accurately cover the printed circuit board 20a. Regardless of the design or the quantity of the reflection sheet 3a, the total assembly process comprises at least twice step of pasting the reflection sheet, once by the reflection sheet 22a and another by the reflection sheet 3a. These two steps are not finished continuously. Due to the complex design of the reflection sheet 3a and the reflection sheet 22a provided, far more time and labor are required in the assembly process.

Furthermore, if we want the reflection sheet 3a to steadily wrap the light-guiding plate 1a, then an adhesive must be smeared over the reflection sheet 3a. However, this wastes a lot of time, and, furthermore, the adhesive impedes illumination, causing a further decrease in the lighting uniformity of the light-guiding plate 1a. What is more, the illumination of the light-guiding plate 1a is also decreased because of the reflection sheet 3a absorbs the light.

The third drawback of the conventional method is the complex nature of the assembly process. Initially a diffusion sheet and a frame are joined together. Then the light-guiding module must be stacked upon a frame to form a module-to-be. Finally, the module-to-be is turned around and placed in a metal frame to form a conventional backlighting module. In practice, this method is highly complex and inconvenient, requiring an unnecessarily long assembly time and thereby adding to production costs.

SUMMARY OF INVENTION

One aspect of a light-guiding module of the present invention is to achieve the light guiding and reflection function, which can reduces the cost of the module. The present invention simplifies the manufacturing process, improves the efficiency of the manufacturing process and increases lighting uniformity and illumination.

The light-guiding module comprises:

a reflection cover, which has a receiving part, and can reflect light;

a light-guiding plate, which has high diaphaneity rate for transmitting light, and is contained in the receiving part of the reflection cover;

at least one lighting mechanism, which is contained in the receiving part of the reflection cover, and the lighting mechanism is disposed between the side of light-guiding plate and the inner side of the receiving part; and a frame, which covers the reflection cover.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF PREFERRED EMBODIMENTS

Referring to FIGS. 3 to 10, the present invention relates to a light-guiding module comprises a reflection cover 1, a light-guiding plate 2 located in the reflection cover 1, at least one lighting mechanism contained in the reflection cover 1 and is disposed between the light-guiding plate 2 and the reflection cover 1, and a frame 5 which covers the reflection cover 1. The lighting mechanism can be a lamp (CCFL) 3, an LED module 4, or a combination of a lamp 3 and an LED module 4.

Figure 3:
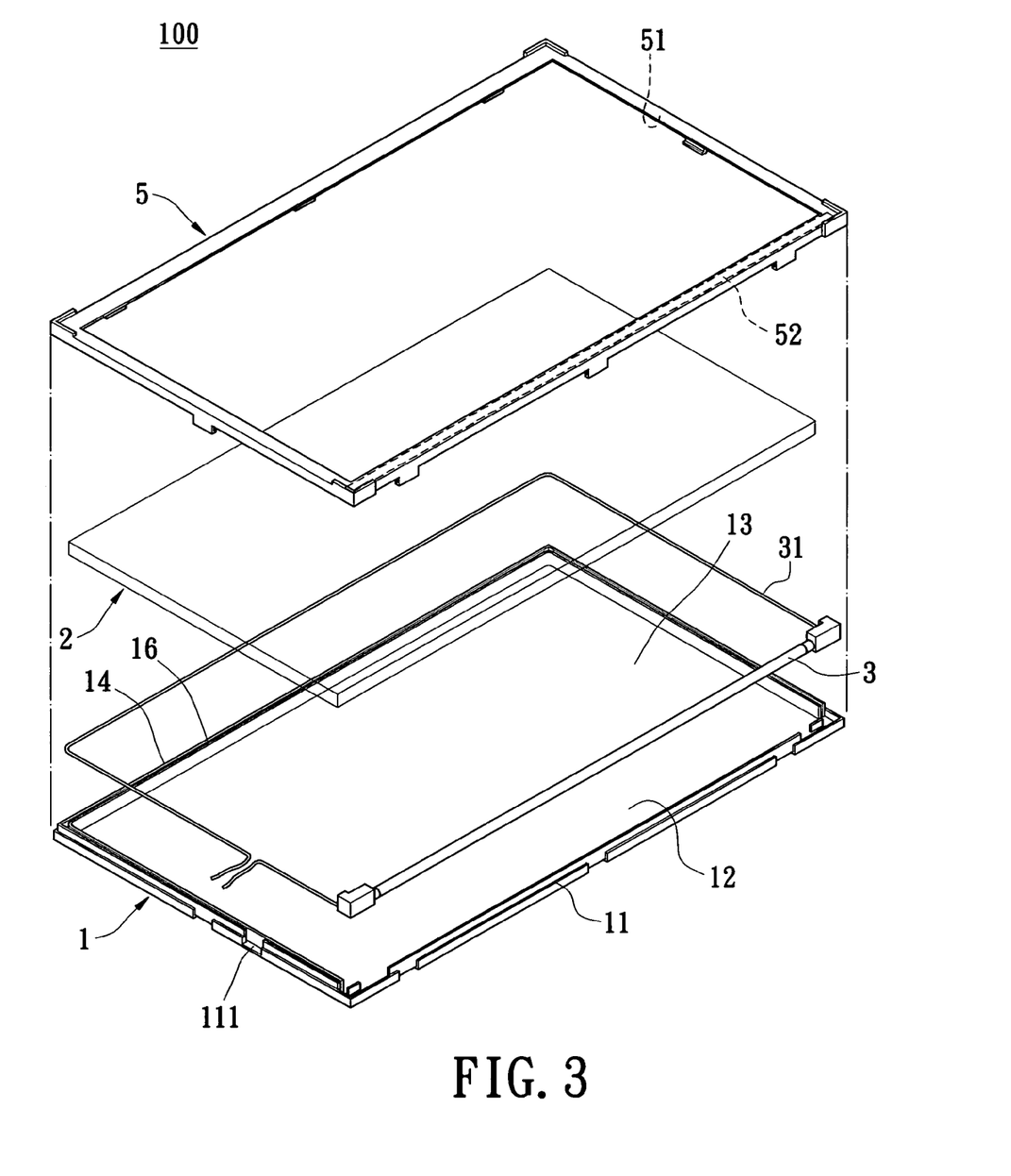
FIG. 3 is a decomposition view of a light-guiding module according to a first embodiment of the present invention.
Figure 3A:
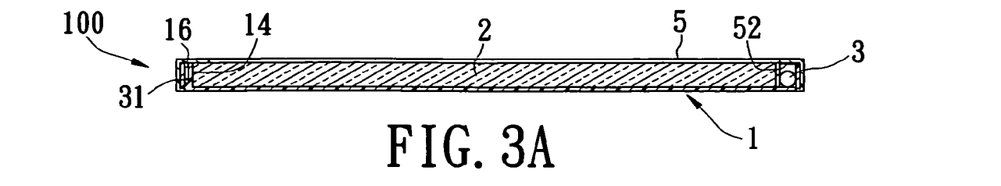
FIG. 3A is a cutaway view of a light-guiding module according to the first embodiment of the present invention.
Figure 4:
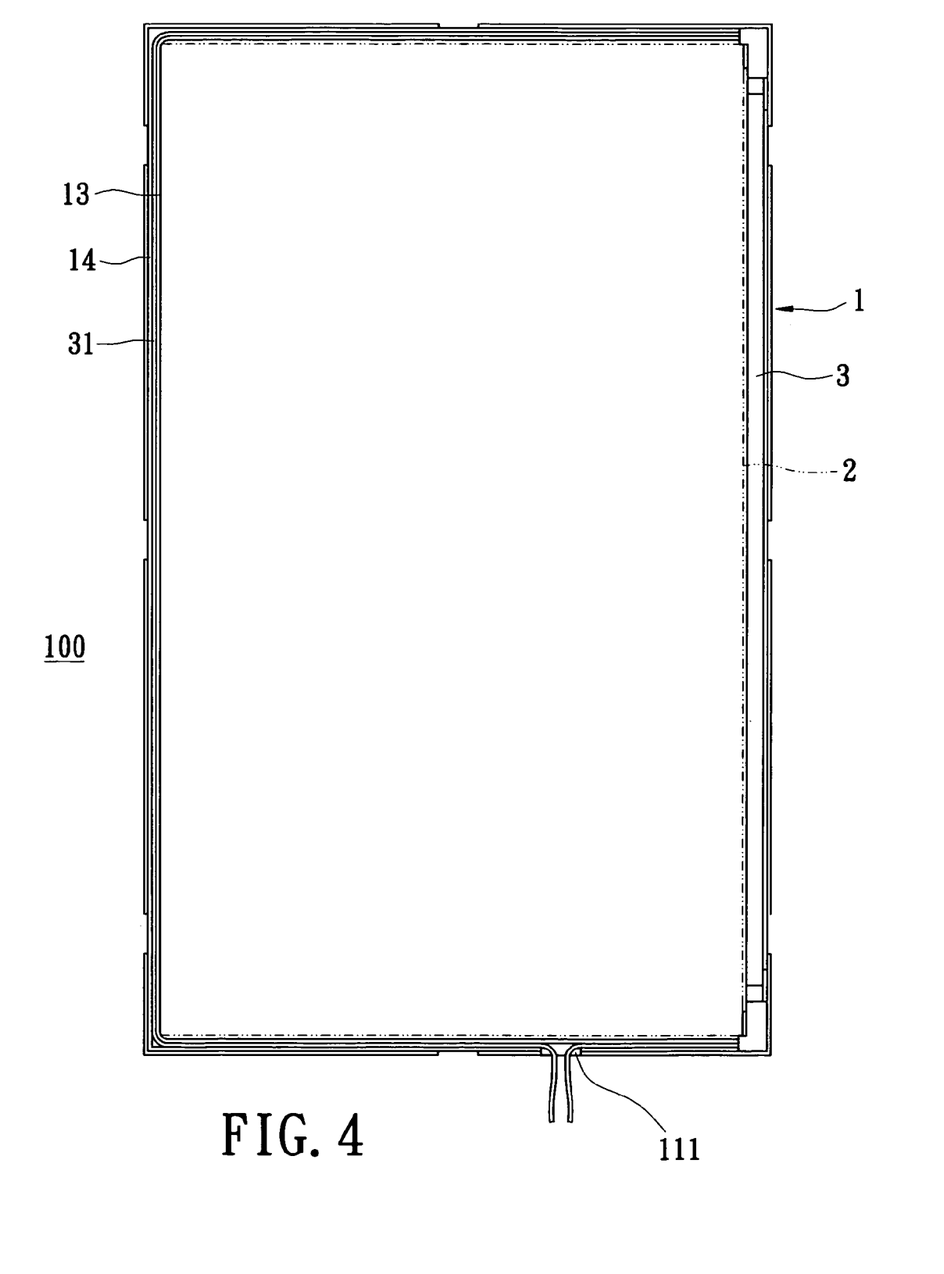
FIG. 4 is a vertical view of a light-guiding module according to the first embodiment of the present invention without a frame.

Referring to FIGS. 3, 3A and 4, a light-guiding module according to the first embodiment is disclosed The light-guiding module 100 includes a reflection cover 1, a light-guiding plate 2, at least one lighting mechanism, and a frame 5. The reflection cover 1 is molded by injection and has high reflectance, can be white or silver, and has a receiving part 13. The light-guiding plate 2 is molded by injection and can be foggy or transparent, and is contained in the receiving part 13 of the reflection cover 1. The lighting mechanism locates at the receiving part 13 of the reflection cover 1, and the lighting mechanism is disposed between the side of the light-guiding plate 2 and the inner-side of the receiving part 13. According to above structure, the light-guiding module 100 of the first embodiment of the present invention is formed. When the lighting mechanism emits a light, the light emits from the corresponding side of the light-guiding plate 2, the light emits from the emitting surface of the light-guiding plate 2 by utilizing the light-guiding plate 2 and the reflection cover 2.

The lighting mechanism is a lamp 3 with straight shape. A bottom surface 51 of the frame 5 corresponding to the lamp 3, where has a reflection sheet 52. The reflection sheet 52 and the reflection cover 1 form a U-shaped surface for reflecting the light.

The reflection cover 1 has four sidewalls 11 and a bottom side 12. The receiving part 13 of the reflection cover 1 has four inner sides, namely the inner side of the four sidewalls 11. The reflection cover 1 is further installed with a plurality of partitions 14 which each have a trench 16. The partitions 14 with high reflection rate are located in the receiving part 13 of the reflection cover 1. The partitions 14 are disposed on three of the sidewalls 11 except for the sidewall having the lamp 3 (as shown FIG. 3, the partition 14 is U-shaped, and the lamp 3 with straight shape connects to the partition 14 to form the square-shaped plate of the light-guiding plate). The two ends of the lamp 3 respectively have an electrical wire 31, the two wires are both received in the trench of the partition, so as not to further decrease the amount of light that is reflected. The sidewall 11 of the reflection cover 1 has an opening 111. The opening 111 links through an inner section of the trench 16 and the electrical wires 31 may jut out from the opening 111.

Figure 5:
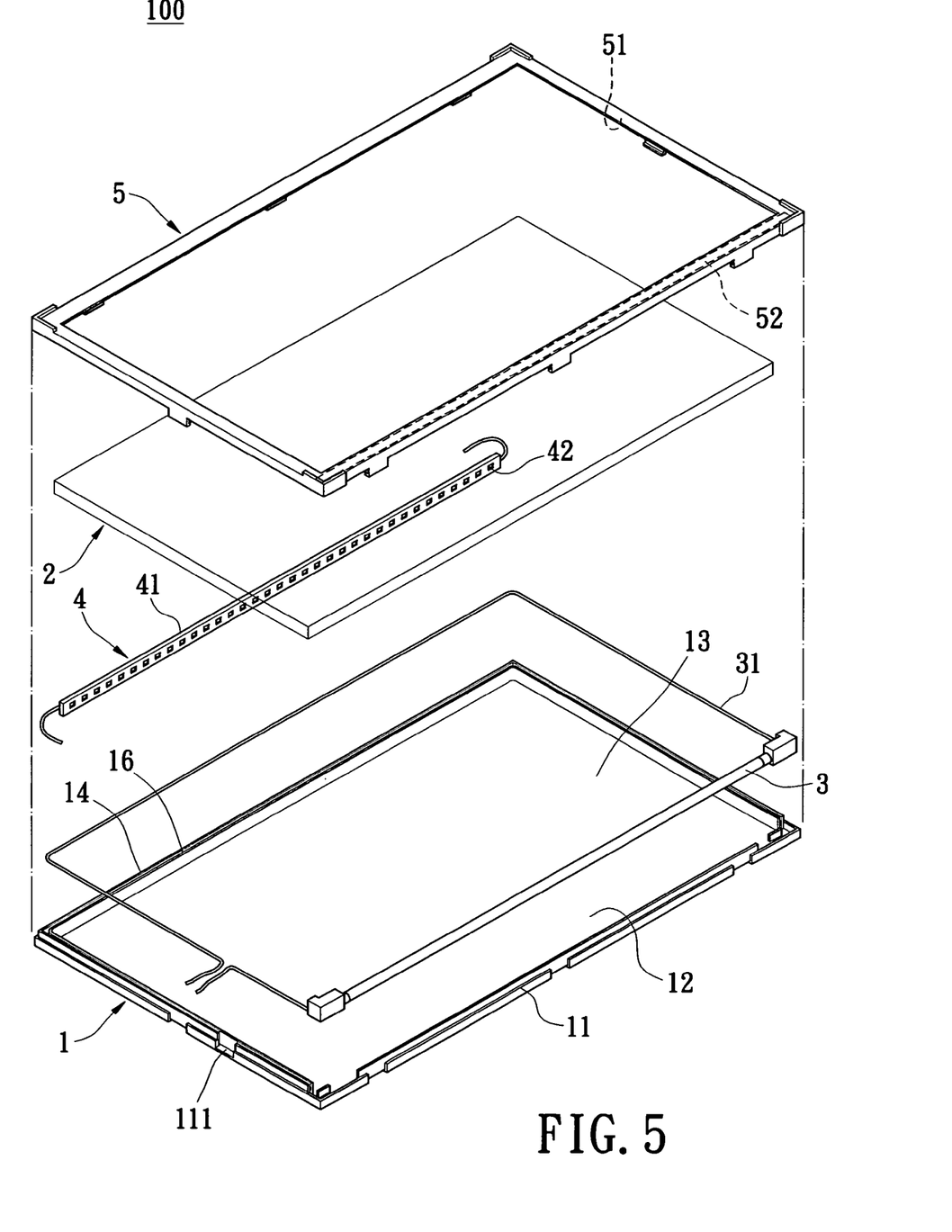
FIG. 5 is a decomposition view of a light-guiding module according to a second embodiment of the present invention.

Referring to FIG. 5, the second embodiment of the present invention is shown. In this embodiment, the structure of the light-guiding module 100 is same as the first embodiment and further comprises an LED module 4. The LED lighting module 4 is disposed between another inner side of the receiving part 13 and another side of the light-guiding plate 2. In a detailed description, the LED lighting module 4 is disposed on the side of the light-guiding plate 2 corresponding to the straight lamp 3. The LED lighting module 4 includes a printed circuit board 41, a plurality of LEDs 42 are arranged on the printed circuit board 41, and the LED lighting module 4 is disposed between one side of the light-guiding plate 2 and the partition 14.

Figure 10A:
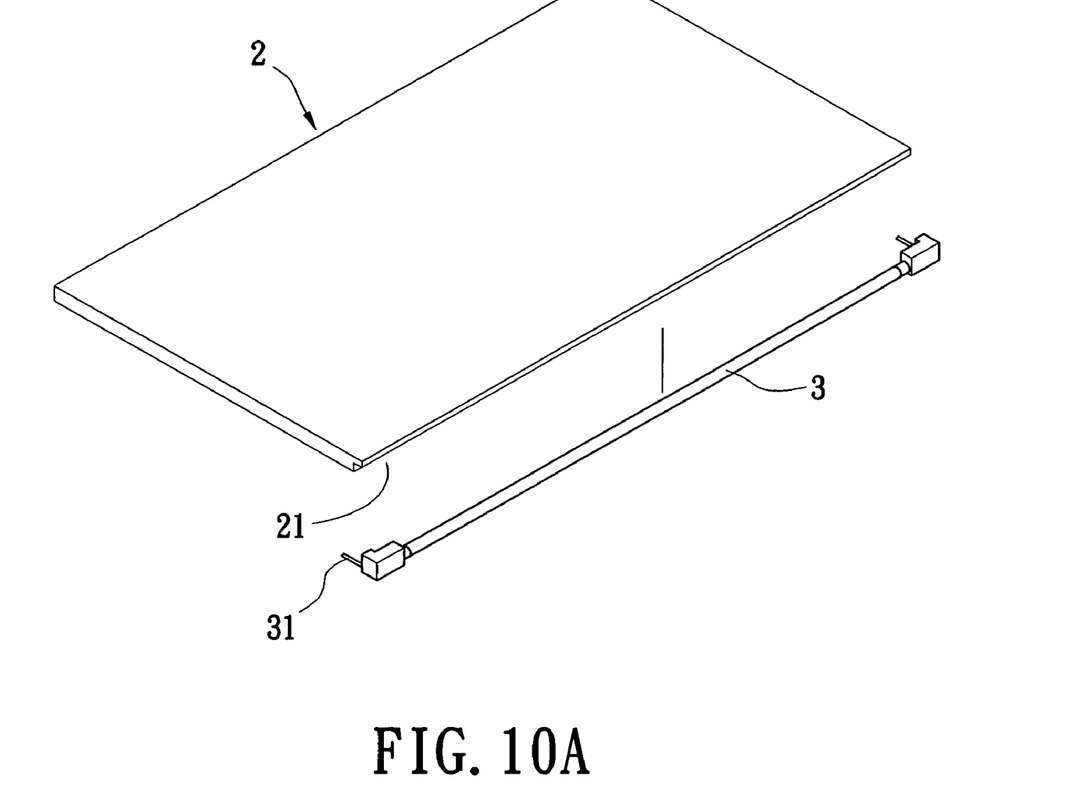
FIG. 10A is a schematic view of another example of the light-guiding plate for the first and second embodiments of the present invention.

Referring to FIG. 10A, the light-guiding plate 2 of the first and second embodiment has a recess 21 corresponding to the lamp 3. The lamp 3 is received in the recess 21. The light emanating from lamp 3 can shine from upper and left light of the lamp to the light-guiding plate 2. In addition, because of the design of the recess, additional light from the lamp 3 shines into the light guiding plate thereby increasing the brightness of the display. So, in other words, there is no need for the reflection sheet 52 of the prior art disposed on the bottom surface 51 of the frame 5. As such, this can be removed from the design, reducing production costs.

Figure 6:
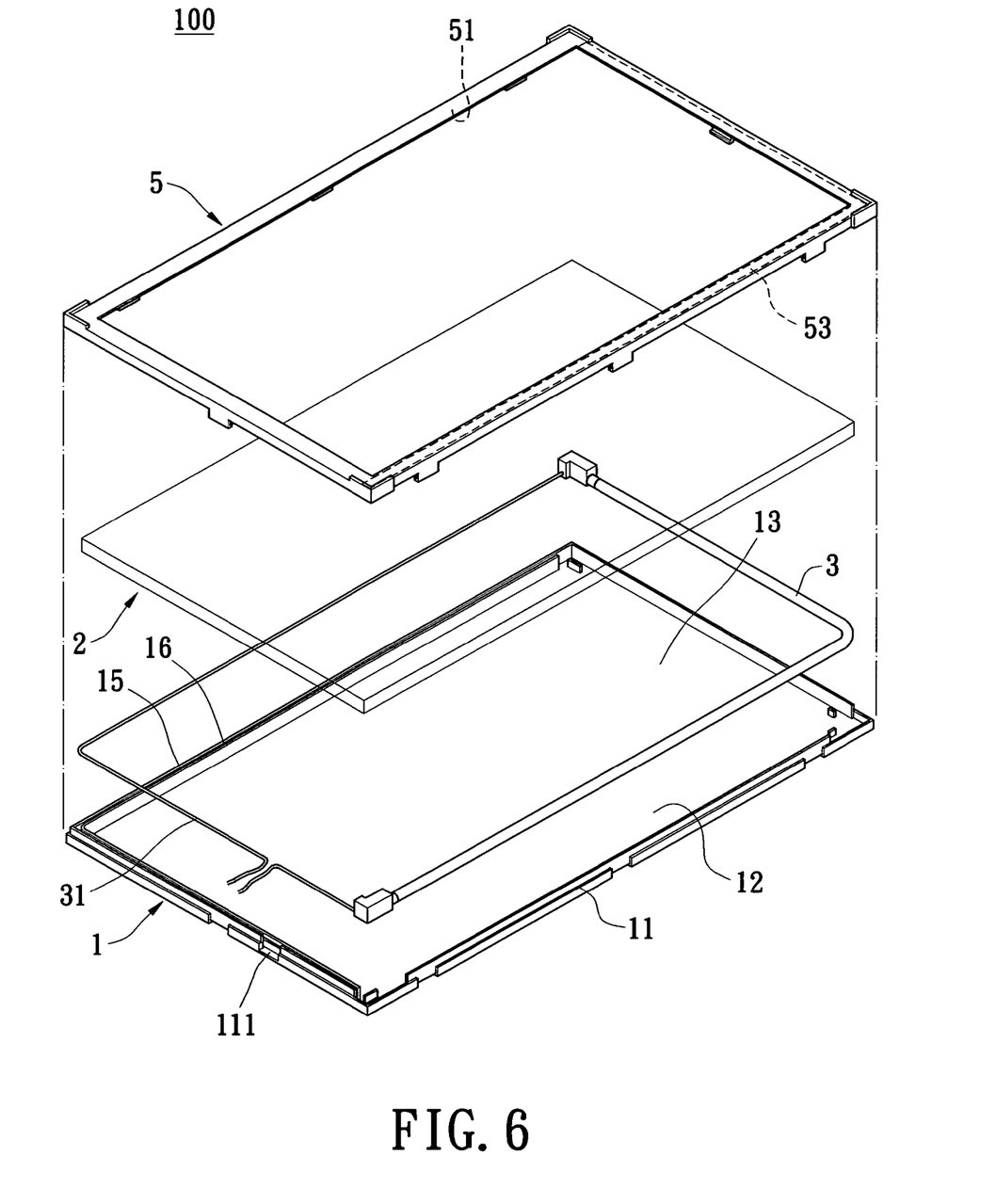
FIG. 6 is a decomposition view of a light-guiding module according to a third embodiment of the present invention.

Referring to FIG. 6, a third embodiment is disclosed In this embodiment, the structure of the light-guiding module 100 is same as the first embodiment except for a lamp and a partition. The lamp 3 is L-shaped (double-crook formed); the partition 15 of the reflection cover 1 is also L-shaped. This design allows the straight lamp 3 to connect to the L-shaped partition 15 and form a frame for the light-guiding plate. Furthermore, the two electrical wires 31 are both disposed in the trench 16 of the partition 15. This design causes light to be reflected off the partition 15 rather than being blocked, thereby improving the brightness of the display.

In the third embodiment the lamp 3 is L-shaped. As such, the L-shaped reflection sheet 53 must correspond to the L-shaped lamp 3. If the bottom surface 51 of the frame 5 further includes a reflection sheet, the upper part the L-shaped lamp 3 can reflect light.

Figure 7:
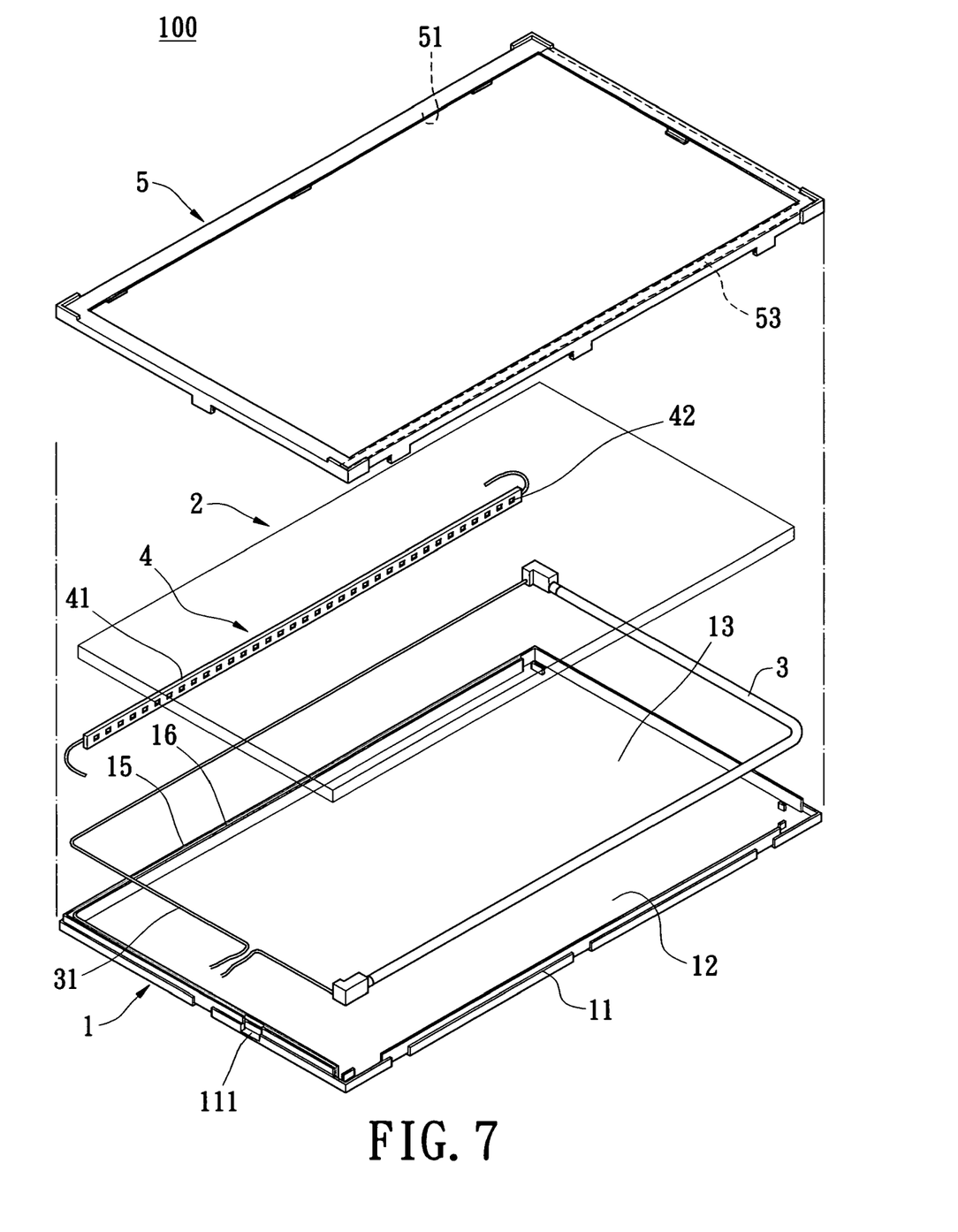
FIG. 7 is a decomposition view of a light-guiding module according to a fourth embodiment of the present invention.
Figure 7A:
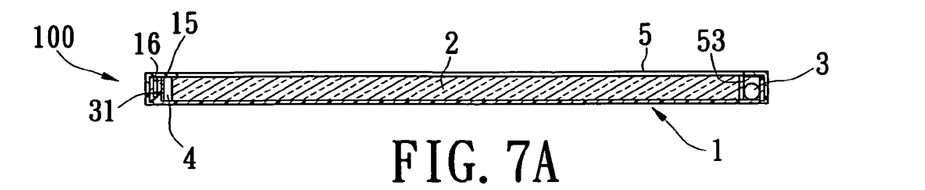
FIG. 7A is a cutaway view of a light-guiding module according to the fourth embodiment of the present invention.
Figure 8:
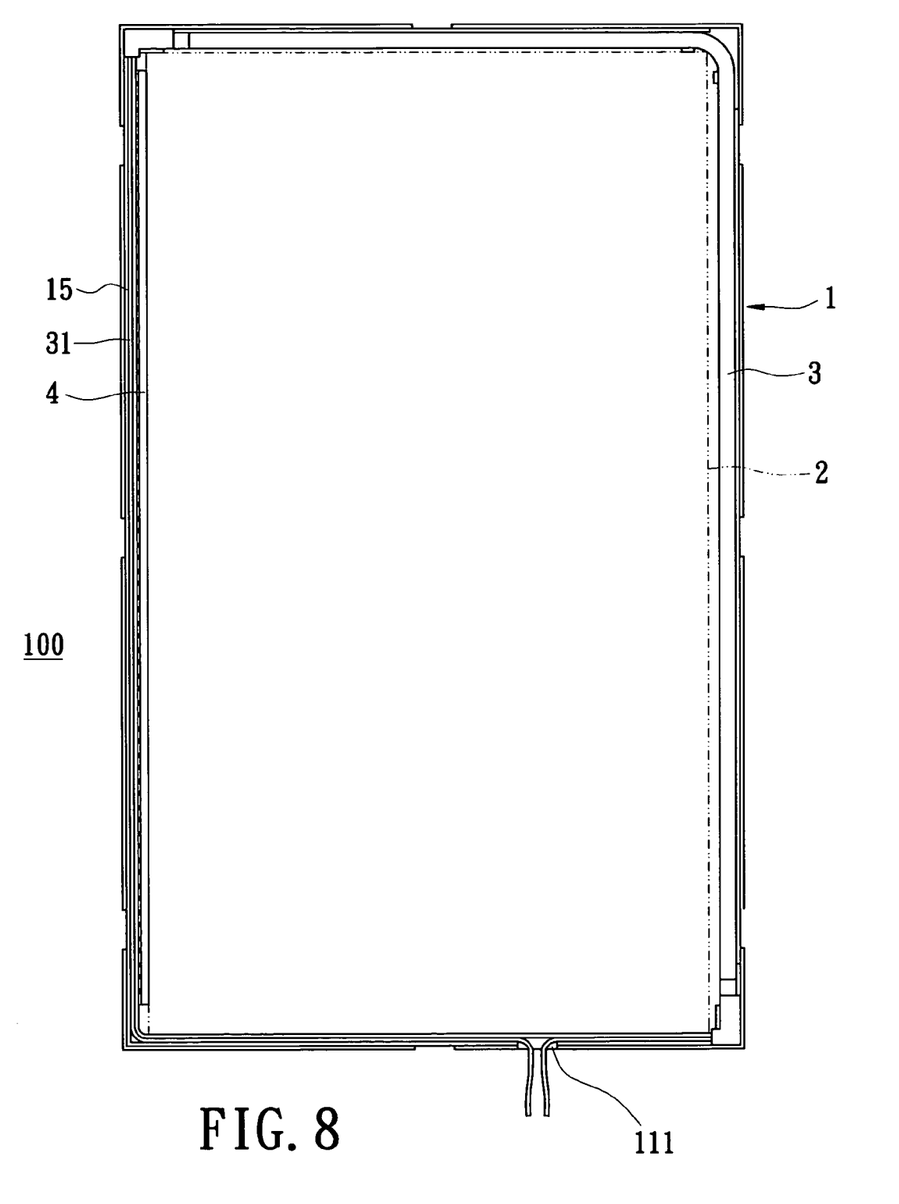
FIG. 8 is a vertical view of a light-guiding module according to the fourth embodiment of the present invention without a frame.

Referring to FIGS. 7, 7A and 8, a light-guiding module of the fourth embodiment is disclosed. The structure of the light-guiding module 100 is same as the third embodiment and further comprises a LED lighting module 4. The LED lighting module 4 is disposed between another inner side of the receiving part 13 and another side of the light-guiding plate 2. The LED lighting module 4 is disposed on the side of the light-guiding plate 2 corresponding to a double-crooked formed section of the L-shaped lamp 3. This design allows for the lighting mechanism of the light-guiding module 100 to further include both the lamp 3 and LED lighting module 4. The LED lighting module 4 is disposed between the side of the light-guiding plate 2 and the partition 15.

Figure 10B:
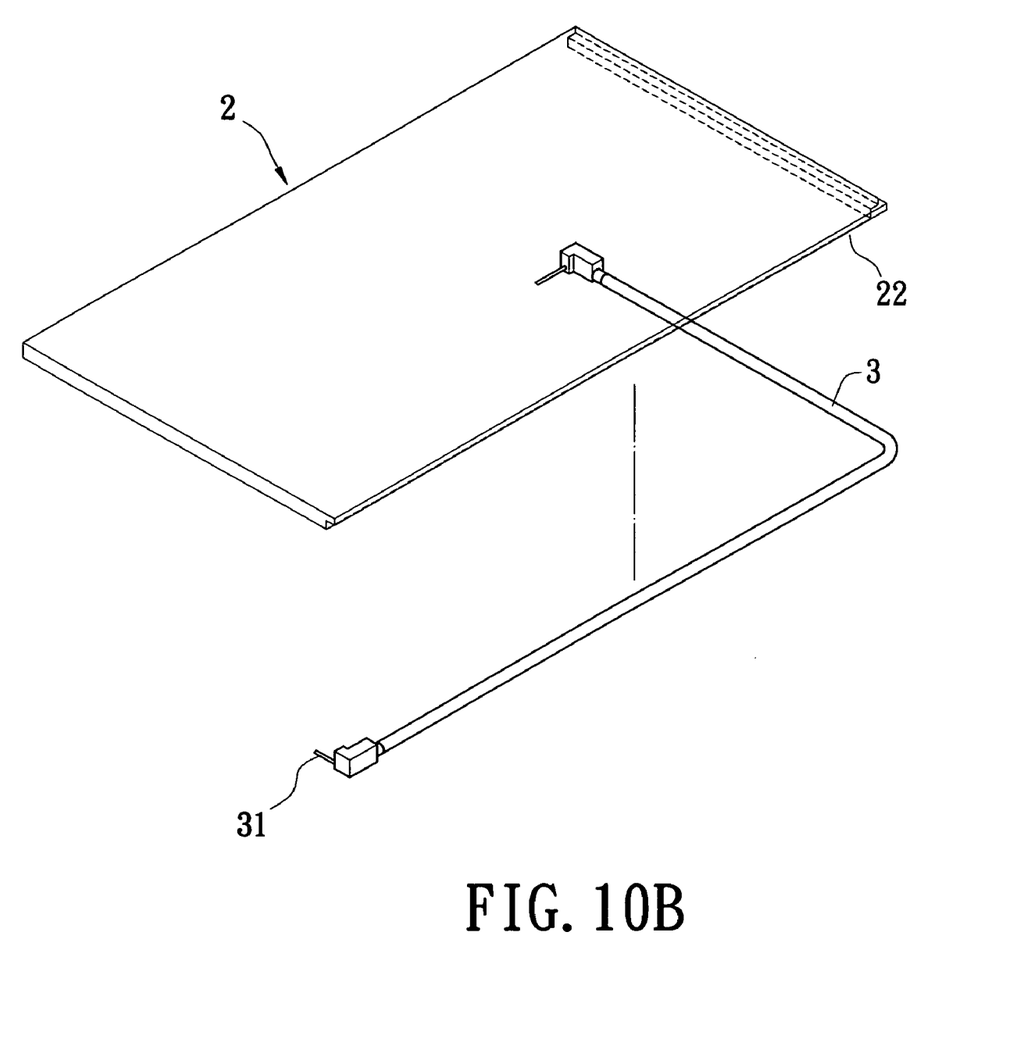
FIG. 10B is a schematic view of another example of the light-guiding plate for the third and fourth embodiments of the present invention.

Referring to FIG. 10B, the light-guiding plate 2 of the third and fourth embodiments can be disposed on a recess 22 corresponding to the L-shaped lamp 3. The electrical wires 31 of the lamp 3 attach to the sides of the light-guiding plate 2. Both the recess 22 and the lamp 3 are L-shaped, so the L-shaped lamp 3 can be received in the recess 22. This ensures that the light comes from the upper and left side of the lamp 3 emit to the light-guiding plate 2. So, in other words, the reflection sheet 53 is no longer required and the cost of production is lowered.

Figure 9:
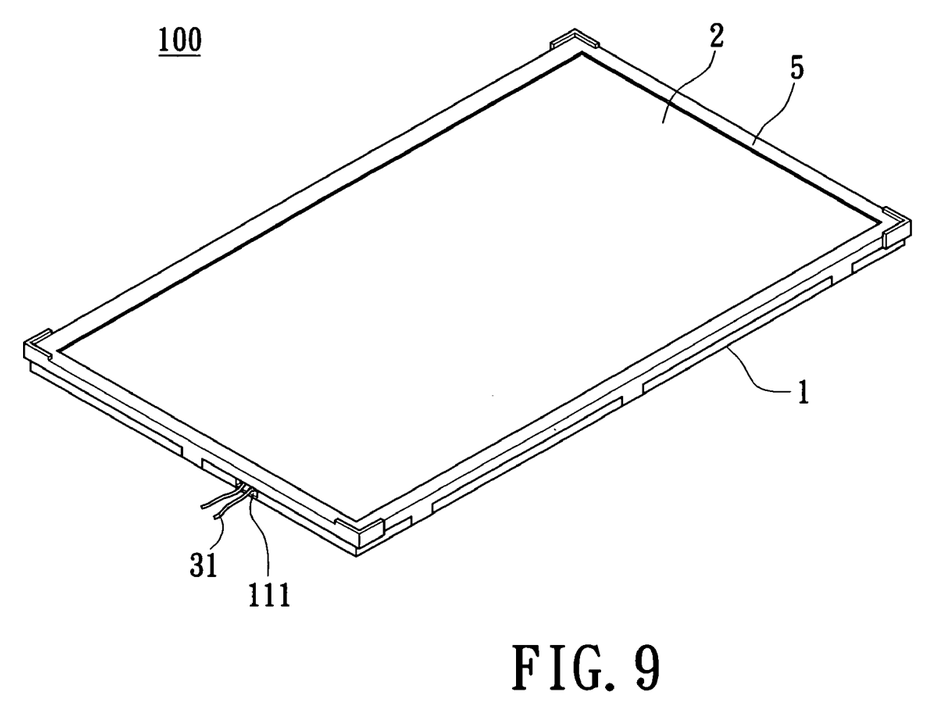
FIG. 9 is a assembly drawing of a light-guiding module according to the first fourth embodiments of the present invention.

Referring to FIG. 9, which is an assembly drawing of a light-guiding module according to the first to fourth embodiments of the present invention, the frame 5 and the reflection cover 1 are combined together. The edges of the light-guiding plate 2 is covered by the frame 5, thereby ensuring that the light-guiding plate 2 is positioned between the frame 5 and the reflection cover 1. Thereby, the light-guiding plate 2 exposed from the frame 5 to form the emitting surface of the LCD display.

Moreover, not only is the reflection cover 1 highly reflective, but it can also be disposed with a reflection paper (not shown) upon it to receive part of a common reflection cover and further reflect light.

According to the present invention, the advantages of the light-guiding module are described as followed:
1) There is no need for the covering reflection sheet necessary in the prior art.
As such, time, labor and material costs are reduced.
2) Less light is absorbed, increasing lighting uniformity and illumination.
3) The conventional step of turning around the whole module during assembly is avoided.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A light-guiding module comprising:
a reflection cover having an integrally formed receiving part for reflecting a light, the reflection cover including a sidewall portion extending peripherally about the receiving part and a partition disposed within the receiving part to define a trench against the sidewall portion;
a light-guiding plate having high diaphaneity rate for transmitting light, the receiving part of the reflection cover receiving the light-guiding plate;
at least one lighting mechanism, received in the receiving part of the reflection cover and disposed between a side of the light-guiding plate and an inner-side of the receiving part of the reflection cover; and
a frame, covering the reflection cover.

2. The light-guiding module of claim 1, wherein the lighting mechanism comprises a lamp disposed between the side of light-guiding plate and the inner-side of receiving part.

3. The light-guiding module of claim 2, wherein the frame has a bottom surface, the bottom surface has a reflection sheet corresponding to the lamp.

4. The light-guiding module of claim 2, wherein the lamp has a straight shape, the lamp is disposed near a single side of the light-guiding plate.

5. The light-guiding module of claim 2, wherein the lamp is L-shaped, the light-guiding plate has two linked sides and the L-shaped lamp is near the two linked sides of the light-guiding plate.

6. The light-guiding module of claim 2, wherein the partition is highly reflective, and disposed at the inner side of the receiving part in which the lamp is not disposed, two ends of the lamp respectively having electrical wire extending therefrom, received in the trench of the partition.

7. The light-guiding module of claim 6, wherein the side of the reflection cover has an opening, and the opening is linked to an inner part of the trench.

8. The light-guiding module of claim 6, wherein the lighting mechanism further includes an LED lighting module, disposing between another side of the light-guiding plate and the partition.

9. The light-guiding module of claim 2, wherein the light-guiding plate has a recess corresponding to the lamp, and the lamp is received in the recess, the recess defining upper and side surfaces disposed directly adjacent the lamp for the concurrent entry of light from the lamp therethrough.

10. The light-guiding module of claim 2, wherein the lighting mechanism further includes an LED lighting module, disposing between another inner side of the receiving part and another side of the light-guiding plate.

11. The light-guiding module of claim 10, wherein the LED lighting module includes a printed circuit board contacting a side of the reflection cover and a plurality of LEDs arranged on the printed circuit board.

12. The light-guiding module of claim 10, wherein the LED lighting module is disposed nearly a side of the light-guiding plate that corresponds to the lamp.

13. The light-guiding module of claim 1, wherein the reflection cover is white or silver.

14. The light-guiding module of claim 1, wherein the frame and the reflection cover are respectively formed together.

15. The light-guiding module of claim 1, wherein the reflection cover is highly reflective.

16. The light-guiding module of claim 1, wherein the receiving part of the reflection cover has a reflection paper that reflects a light.

* * * * *